(12) United States Patent
Okuyama

(10) Patent No.: US 6,859,484 B2
(45) Date of Patent: Feb. 22, 2005

(54) TRANSMISSION DIVERSITY DETECTION CIRCUIT AND DETECTION METHOD

(75) Inventor: Toshiyuki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 730 days.

(21) Appl. No.: 09/740,975

(22) Filed: Dec. 21, 2000

(65) Prior Publication Data

US 2001/0006531 A1 Jul. 5, 2001

(30) Foreign Application Priority Data

Dec. 27, 1999 (JP) .......................... 11-368599

(51) Int. Cl.[7] .............................. H04B 1/173
(52) U.S. Cl. ................... 375/130; 375/267; 375/299
(58) Field of Search ................. 375/130, 267; 370/334; 455/101

(56) References Cited

U.S. PATENT DOCUMENTS

| | | | |
|---|---|---|---|
| 5,542,107 A | * | 7/1996 | Kay ........................ 455/513 |
| 5,812,935 A | * | 9/1998 | Kay ........................ 370/333 |
| 2004/0018855 A1 | * | 1/2004 | Wallace et al. ............ 455/561 |

OTHER PUBLICATIONS

3GPP ($3^{rd}$ Generation Partnership Project) specification TS25.211 V3.0.0, Oct., 1999, pp. 1–33.

* cited by examiner

Primary Examiner—Amanda Le
Assistant Examiner—Lawrence B. Williams
(74) Attorney, Agent, or Firm—Sughrue Mion, PLLC

(57) ABSTRACT

A transmission diversity detection system that detects the presence or absence of a STTD (Space-Time Transmit Diversity) transmission diversity by a simple arithmetic operation. The transmission diversity detection circuit notifies presence or absence of a transmission diversity of spread spectrum communication by modulation of a synchronization channel (SCH). The transmission diversity detection circuit includes arithmetic circuit for calculating a calculated value of $C_{2n,0} \times S_{2n,0}^* + C_{2n,0}^* \times S_{2n,0} + C_{2n,1}^* \times C_{2n,1}$, in first and second symbols in a predetermined number of series of slots with respect to a reception signal, taking a primary common pilot channel (CPICH) symbol with respect to the first symbol as $C_{2n,0}$, a SCH symbol with respect to the first symbol as $S_{2n,0}$, and a primary CPICH symbol with respect to the second symbol as $C_{2n,1}$, taking a complex conjugate of the primary CPICH symbol $C_{2n,0}$ as $C_{2n,0}^*$, a complex conjugate of SCH symbol $S_{2n,0}$ as $S_{2n,0}^*$, and a complex conjugate of the primary CPICH symbol $C_{2n,1}$ as $C_{2n,1}^*$ and judgment circuit for making judgment whether transmission diversity is present or not depending upon positive or negative of the calculated value.

11 Claims, 12 Drawing Sheets

TRANSMISSION DIVERSITY DETECTION CIRCUIT AND DETECTION METHOD

BACKGROUND OF THE INVENTION

1. Field of the Invention

The present invention relates generally to a transmission diversity detection circuit, a detection method thereof and a storage medium storing a transmission diversity detection program. More particularly, the invention relates to a transmission diversity detection circuit, a detection method thereof and a storage medium storing a transmission diversity detection program, applicable for spread spectrum communication performing transmission diversity, and especially applicable for the case where presence or absence of transmission diversity is notified by modulation of a SCH (Synchronization channel).

2. Description of the Related Art

A transmission diversity to perform transmission from a plurality (for example, two) of transmission antennas provided in one base station, and to receive transmitted data by a mobile station, such as a portable terminal or the like, is known. In such transmission diversity, since a plurality of paths between the base station and a mobile station are established, communication can be performed even when receiving condition in one path is not good, if receiving condition of another path is good.

A transmission diversity system applicable for spread spectrum communication has been disclosed in 3GPP (3rd Generation Partnership Project) specification TS25.211 V3.0.0 (TSGR1#7(99)g0). This transmission diversity system will be discussed with reference to FIGS. 7 to 13.

In FIG. 7, there is shown a transmission pattern of a primary CPICH (common pilot channel) symbol in the transmission diversity. In the shown example, it is assumed that transmission is performed using two transmission antennas 1 and 2. As shown in FIG. 7, from the antenna 1, "A" is transmitted continuously. On the other hand, from the antenna 2, "A", "A" and "−A", "−A" are transmitted alternately. Here, A is a symbol 1+j.

In the shown example, one frame (frame) is consisted of fifteen time slots (hereinafter, merely called as "slot") #0 to #14. Accordingly, since one frame consists of an odd number of slots, "−A" and "A" are transmitted from the antenna 2 at the boundary of the frame PB (frame boundary). At portions other than the boundary FB, "A", "A" and "−A", "−A" are transmitted alternately from the antenna 2 as set forth above.

It should be noted that, when transmission diversity is not performed, the primary CPICH symbol is not transmitted on the side of the antenna 2, and only primary CPICH symbol on the side of the antenna 1 is transmitted.

In FIG. 8, there is shown a transmission pattern of the SCH. The SCH represents both of a primary SCH and a secondary SCH. Respective SCHs are those, in which the symbol 1+j is spread with a primary synchronization code and a secondary synchronization code. These SCHs are further modulated with "a".

In FIG. 8, there is shown the slots #0 to #14 forming one frame. It is assumed that a period $T_{slot}$ of the slot is 2560 chips. On the other hand, a period $T_{frame}$ is 15×$T_{slot}$. Then, in one slot, after transmission of 256 chips of the primary SCH and the secondary SCH, data portion indicated by a primary CCPCH (Common Control Physical Channel) is transmitted.

"Cp" in the primary SCH is a primary synchronization code. On the other hand, "Cs" in the secondary SCH is a secondary synchronization code. It should be noted that "$Cs^{i,k}$" (k=0 to 14) represents that a code group number, in which a scramble code used in the base station, is "i".

Here, "a" takes a value of "1" or "−1" according to the following condition. Namely, concerning the data portion indicated by primary CCPCH in FIG. 8, when transmission diversity is performed in a method called space time block coding based transmit antenna diversity (STTD), "a" is "1" and when STTD transmission diversity is not performed, "a" becomes "−1".

Hereinafter, discussion will be given for STTD transmission diversity. FIG. 9 is a block diagram showing a construction of a primary portion of the base station for performing STTD transmission diversity. The base station is constructed with a STTD encoder 41 for inputting a quadrature phase shift keying (QPSK) symbol, a multiplexer (MUX) 42 being input an encoded output of the encoder 41, a pilot signal and a diversity pilot signal, a multipliers 43a and 43b for spreading an output of the multiplexer 42 with a scramble code C, and antennas 1 and 2 provided corresponding to the multipliers 43a and 43b. By utilizing the base station having such construction, the STTD transmission diversity described in the specification set both above is performed.

Transmitting operation of the base station with the construction set forth above will be discussed with reference to FIG. 10. The STTD encoder 41 converts input symbol as shown in FIG. 10. In FIG. 10, among input signal to the STTD encoder 41, in a front portion of the data portion $N_{data}$, symbols $S_1$ and $S_2$ are present. Namely, during a period from a time 0 to a time T, symbol $S_1$ is present, and during a period from the time T to a time 2T, the symbol $S_2$ is present.

Concerning these symbols $S_1$ and $S_2$, the STTD encoder 41 outputs symbols $S_1$ and $S_2$ as they are, to the side of the antenna 1 (Ant1). On the other hand, to the side of the antenna 2 (Ant2), instead of outputting symbols $S_1$ and $S_2$ as they are, a complex conjugate $-S_2^*$ of the symbol $S_2$ and a complex conjugate $S_1^*$ of the symbol $S_1$ are output alternately. As a result, during the period from the time 0 to time T, the symbol $S_1$ is transmitted from the antenna 1. At the same time, the complex conjugate $-S_2^*$ of the symbol $S_2$ is transmitted from the antenna 2. On the other hand, during the period from the time T to the time 2T, the symbol $S_2$ is transmitted from the antenna 1, and at the same time, the complex conjugate $S_1^*$ of the symbol $S_1$ is transmitted from the antenna 2.

Expressing the transmitting condition in an orthogonal coordinates, the symbol $S_1$ and the complex conjugate $-S_2^*$ are transmitted during the period from the time 0 to the time T as shown in FIG. 11A. On the other hand, the symbol $S_2$ and the complex conjugate $S_1^*$ are transmitted during the period from the time T to the time 2T as shown in FIG. 11B.

The following is a reason why the complex conjugate of the symbol is output from the antenna 2. For example, when the signal arriving from the antenna 1 during the period from the time 0 to the time T and the signal arriving from the antenna 2 during the period from the time 0 to the time T are situated in a relationship to weaken with each other, the signal arriving from the antenna 1 during the period from the time T to the time 2T and the signal arriving from the antenna 2 during the period from the time T to the time 2T are inherently situated in a relationship to strengthen with each other. Namely, as shown in FIG. 10, between two antennas of the base station and an antenna 3 on reception side, there are paths P1 to Pj (j is a natural number) are present as propagation paths. Signals received by the antenna 3 becomes a sum of symbols transmitted from the antennas 1 and 2 at the same timing and varied amplitudes and phases through a plurality of paths. Even if the signals received by the antenna is weaken due to variation of the amplitude and the phase caused by the paths during a certain period, i.e. either the period from 0 to T or the period from T to 2T, the arriving signals from a plurality of paths are strengthened with each other in another period, to increase probability of correct reception.

FIG. 12 shows a typical construction of the major part on a reception side in relation to the base station. Referring to FIG. 12, the reception side is constructed with a reception antenna 3, a demodulator (Q-DEM) 71 corresponding to the foregoing encoder and an A/D converter 27 which converts an analog signal Ia and Qa into digital signals Id and Qd. In a receiver of the construction set forth above, if transmission diversity is performed on the base station side, the reception can be correctly performed.

Here, FIG. 13 shows a transmission diversity pattern of the SCH. The transmission diversity system is those called as TSTD (time switched transmit diversity for SCH) and is different from the foregoing STTD transmission diversity. When the TSTD transmission diversity is not performed, the SCH is performed only from the antenna 1. Accordingly, irrespective presence or absence of the TSTD transmission diversity, the SCH is never transmitted from a plurality of antennas, simultaneously.

On the other hand, in the above-mentioned STTD transmission diversity, encoding is performed by means of the STTD encoder 41 shown in FIG. 10. Therefore, decoding by the decoder becomes necessary.

However, in either for STTD transmission diversity or TSTD transmission diversity, presence and absence of transmission diversity will not be preliminarily notified from the base station as transmission side. Namely, if there is a limitation in installation of the antennas or the like, transmission diversity is not always performed in all base stations, the presence or absence of the STTD transmission diversity has to be detected by the terminal as reception side. Therefore, whether transmission diversity is performed or not should be detected on the reception side.

Upon detection, in general, it may be merely required to predict direction of modulation "a" of the SCH. However, phase of the symbol through the propagation paths becomes indeterminative. Therefore, on the basis of phase difference with a known symbol to be a reference of the phase, the direction of modulation "a" of the SCH is predicted.

As a known symbol to be a reference of the phase, use of a primary CPICH symbol is considered. Namely, as shown in FIG. 14, by detecting a relative phase relationship between the primary CPICH symbol P and the SCH symbol S, the direction of modulation "a" of the SCHs can be predicted. Referring to FIG. 14, if the phase difference between the primary CPICH symbol P and the SCH symbol S is 0°, the modulation a=1, and if the phase difference is 180°, the modulation a=−1. However, since pilot pattern is different depending upon presence or absence of the transmission diversity, prediction cannot be done in straightforward.

In the structures of the slot and symbol as set forth above, in order to predict the phase of the SCH, it may be required to predict the propagation path on the side of the first antenna. In this case, in order to predict the propagation path on the side of the first antenna, at least a pair of pilot symbols having mutually opposite pilot patterns on the side of the second antenna are required.

However, when two symbols are used, if an error is present in a reference oscillation frequency between the base station and the mobile terminal, phase rotation is caused between the symbols. This makes it necessary to simultaneously perform prediction and correction of phase rotation, which makes the process very complicated.

SUMMARY OF THE INVENTION

The present invention has been worked out in view of the drawbacks in the prior art set forth above. It is therefore an object of the present invention to provide a transmission diversity detection circuit, a transmission diversity detection method and a storage medium storing a transmission diversity detection program, which can detect presence or absence of a STTD transmission diversity by simply arithmetic operation.

According to the first aspect of the present invention, a transmission diversity detection circuit for notifying presence or absence of a transmission diversity of spread spectrum communication by modulation of SCH, comprises:

arithmetic means for calculating a calculated value of $C_{2n,0} \times S_{2n,0}{}^* + C_{2n,0}{}^* \times S_{2n,0} + C_{2n,1}{}^* \times C_{2n,1}$, in first and second symbols in a predetermined number of series of slots with respect to a reception signal, taking a primary CPICH symbol with respect to the first symbol as $C_{2n,0}$, a SCH symbol with respect to the first symbol as $S_{2n,0}$, and a primary CPICH symbol with respect to the second symbol as $C_{2n,1}$;

taking a complex conjugate of the primary CPICH symbol $C_{2n,0}$ as $C_{2n,0}{}^*$, a complex conjugate of SCH symbol $S_{2n,0}$ as $S_{2n,0}{}^*$, and a complex conjugate of the primary CPICH symbol $C_{2n,1}$ as $C_{2n,1}{}^*$; and judgment means for making judgment whether transmission diversity is present or not depending upon positive or negative of the calculated value.

In the preferred construction, the arithmetic means may comprise:

circuits for deriving the complex conjugate $C_{2n,0}{}^*$ of the primary CPICH symbol $C_{2n,0}$, a complex conjugate $S_{2n,0}{}^*$ of SCH symbol 25 $S_{2n,0}$, and a complex conjugate $C_{2n,1}{}^*$ of the primary CPICH symbol $C_{2n,1}$;

multipliers calculating $C_{2n,0} \times S_{2n,0}{}^*$, $C_{2n,0}{}^* \times S_{2n,0}$ and $C_{2n,1}{}^* \times C_{2n,1}$; and an adder calculating a sum of $C_{2n,0} \times S_{2n,0}{}^* + C_{2n,0}{}^* \times S_{2n,0} + C_{2n,1}{}^* \times C_{2n,1}$, the judgment means makes judgment whether transmission diversity is performed or not depending upon positive or negative of sign of the sum.

The predetermined slot may be even numbered slots in one frame, the first and second symbols are (0)th and first symbols of the slot. The arithmetic means may perform arithmetic operation upon performing communication. The arithmetic means may perform arithmetic operation upon registration of position for communication.

According to the second aspect of the present invention, transmission diversity detection method for notifying presence or absence of a transmission diversity of spread spectrum communication by modulation of SCH, comprising:

calculating step for calculating a calculated value of $C_{2n,0} \times S_{2n,0}{}^* + C_{2n,0}{}^* \times S_{2n,0} + C_{2n,1}{}^* \times C_{2n,1}$, in first and second symbols in a predetermined number of series of slots with respect to a reception signal, taking a primary CPICH symbol with respect to the first symbol as $C_{2n,0}$, a SCH symbol with respect to the first symbol as $S_{2n,0}$, and a primary CPICH symbol with respect to the second symbol as $C_{2n,1}$, and taking a complex conjugate of the primary CPICH symbol $C_{2n,0}$ as $C_{2n,0}^*$, a complex conjugate of SCH symbol $S_{2n,0}$ as $S_{2n,0}^*$, and a complex conjugate of the primary CPICH symbol $C_{2n,1}$ as $C_{2n,1}^*$; and judging step for making judgment whether transmission diversity is present or not depending upon positive or negative of the calculated value.

The calculating step may comprise steps of:

deriving the complex conjugate $C_{2n,0}^*$ of the primary CPICH symbol $C_{2n,0}^*$, a complex conjugate $S_{2n,0}^*$ of SCH symbol $S_{2n,0}$, and a complex conjugate $C_{2n,1}$ of the primary CPICH symbol $C_{2n,1}$;

calculating $C_{2n,0} \times S_{2n,0}^*$, $C_{2n,0}^* \times S_{2n,0}$ and $C_{2n,1}^* \times C_{2n,1}$; and calculating a sum of $C_{2n,0} \times S_{2n,0}^* + C_{2n,0}^* \times S_{2n,0} + C_{2n,1}^* \times C_{2n,1}$.

The judging step makes judgment whether transmission diversity is performed or not depending upon positive or negative of sign of the sum.

The predetermined slot may be even numbered slots in one frame, the first and second symbols are (0)th and first symbols of the slot.

According to the third aspect of the present invention, a storage medium storing a program implementing a transmission diversity detection method for notifying presence or absence of a transmission diversity of spread spectrum communication by modulation of SCH, the program comprises:

calculating step for calculating a calculated value of $C_{2n,0} \times S_{2n,0}^* + C_{2n,0}^* \times S_{2n,0} + C_{2n,1}^* \times C_{2n,1}$, in first and second symbols in a predetermined number of series of slots with respect to a reception signal, taking a primary CPICH symbol with respect to the first symbol as $C_{2n,0}$, a SCH symbol with respect to the first symbol as $S_{2n,0}$, and a primary CPICH symbol with respect to the second symbol as $C_{2n,1}$, and taking a complex conjugate of the primary CPICH symbol $C_{2n,0}$ as $C_{2n,0}^*$, a complex conjugate of SCH symbol $S_{2n,0}$ as $S_{2n,0}^*$, and a complex conjugate of the primary CPICH symbol $C_{2n,1}$ as $C_{2n,1}^*$; and judging step for making judgment whether transmission diversity is present or not depending upon positive or negative of the calculated value.

The calculating step may derive the complex conjugate $C_{2n,0}^*$ of the primary CPICH symbol $C_{2n,0}$, a complex conjugate $S_{2n,0}^*$ of SCH symbol $S_{2n,0}$, a complex conjugate $C_{2n,1}^*$ of the primary CPICH symbol $C_{2n,1}$ and a complex conjugate $S_{2n,1}^*$ of the SCH symbol $S_{2n,1}$;

The judging step makes judgment whether transmission diversity is performed or not depending upon positive or negative of sign of the sum.

The predetermined slot may be even numbered slots in one frame, the first and second symbols are (0)th and first symbols of the slot.

In short, in accordance with the present invention, by checking the sign of the result of simple arithmetic operation positive or negative, presence or absence of STTD transmission diversity can be detected within a short period, i.e. for a period of two symbols at the shortest even when an error is present between reference oscillation frequencies of the base station and the terminal.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
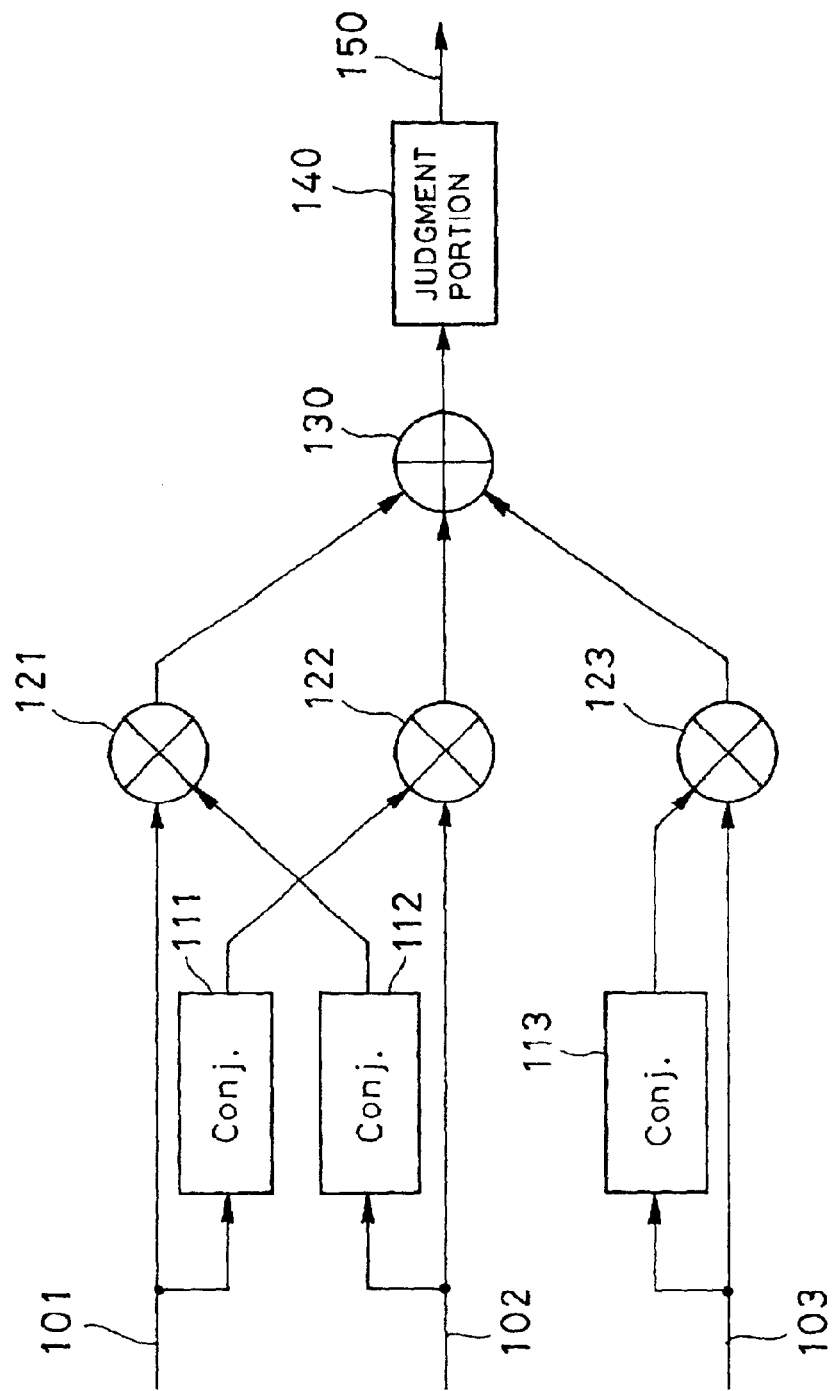
FIG. 1 is a block diagram showing a construction for realizing one embodiment of a transmission diversity detection circuit according to the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In the following disclosure, like components to those discussed in connection with the prior art, will be identified by like reference numerals and detailed description thereof will be omitted for avoiding redundant discussion and whereby to keep the disclosure simple enough to facilitate clear understanding of the present invention.

FIG. 1 is a block diagram showing a construction of the preferred embodiment of a STTD transmission diversity detection circuit according to the present invention. In FIG. 1, there is shown a construction on a receiver side of the shown system. In FIG. 1, the receiver of the shown system is constructed with complex conjugate calculating portion (Conj.) 111, 112 and 113 for calculating respective complex conjugates for respective complex signals input to complex input portions 101, 102 and 103, complex multipliers 121, 122 and 123 for performing multiplication, a complex adder 130 adding results of multiplication (products) of the multipliers, and judgment portion 140 for making judgment whether transmission diversity is present or not depending upon sign of the result of addition.

With such construction, to the complex signal input portions 101, 102 and 103, (0)th primary CPICH symbol (to be expressed by $C_{2n,0}$) in even number slot, (0)th SCH symbol (to be expressed by $S_{2n,0}$) in even number slot at the same position, and the first primary CPICH symbol (to be expressed as $C_{2n,1}$) in even number slot are input, respectively.

Figure 2:
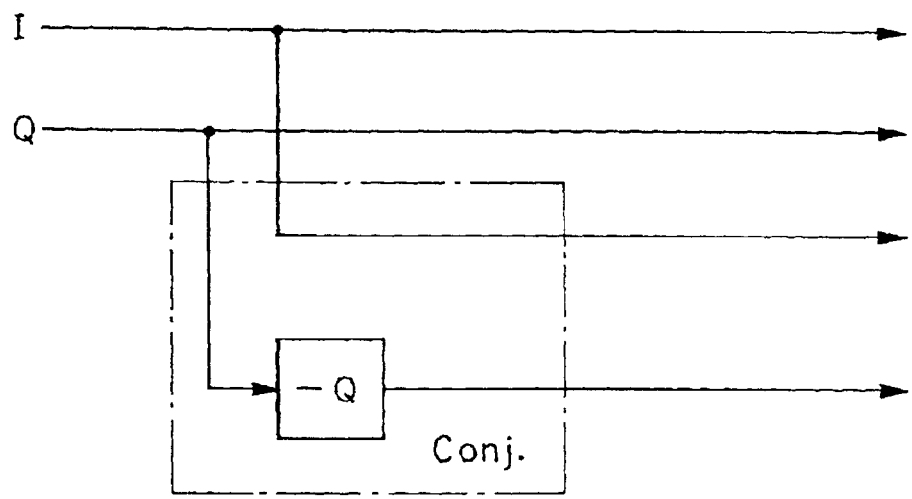
FIG. 2 is a block diagram showing a construction of a complex conjugate calculating portion in FIG. 1.

The complex conjugate calculating portions 111, 112 and 113 calculate complex conjugates of input complex signals and output the resultant complex conjugates. From the complex conjugate calculating portion 111, a complex conjugate $C_{2n,0}^*$ of the complex signal $C_{2n,0}$ is output. From the complex conjugate calculating portion 112, a complex conjugate $S_{2n,0}^*$ of the complex signal $S_{2n,0}$ is output. From the complex conjugate calculating portion 113, a complex conjugate $C_{2n,1}^*$ of the complex signal $C_{2n,1}$ is output. It should be noted that the complex conjugate calculating portions 111, 112 and 113 take I signal and Q signal as inputs, derive the complex conjugates with inverting the Q signal and output resultant complex conjugates, as shown in FIG. 2.

Returning to FIG. 1. the complex multipliers 121, 122 and 123 perform complex multiplication of two input complexes and output products. From the complex multiplier 121, $C_{2n,0} \cdot S_{2n,0}^*$ is output. From the complex multiplier 122, $C_{2n,0}^* \cdot S_{2n,0}$ is output. From the complex multiplier 123, $C_{2n,1} \cdot C_{2n,1}^*$ is output.

The complex adder 130 calculates a sum of input three complex number $C_{2n,0} \cdot S_{2n,0}^* + C_{2n,0}^* \cdot S_{2n,0} + C_{2n,1} \cdot C_{2n,1}^*$ and outputs the sum. The judgment portion 140 makes judgment whether transmission diversity is present or not on the basis of the result output from the complex adder 130. The result of judgment is output from a judgment result output portion 150.

It should be noted that among three complex signal input portions, since the complex signal input portion 101 and the complex signal input portion 102 are symmetric to each other, the same result of judgment is obtained even if $S_{2n,0}$ and $C_{2n,0}$ are input in alternate function.

Figure 7:
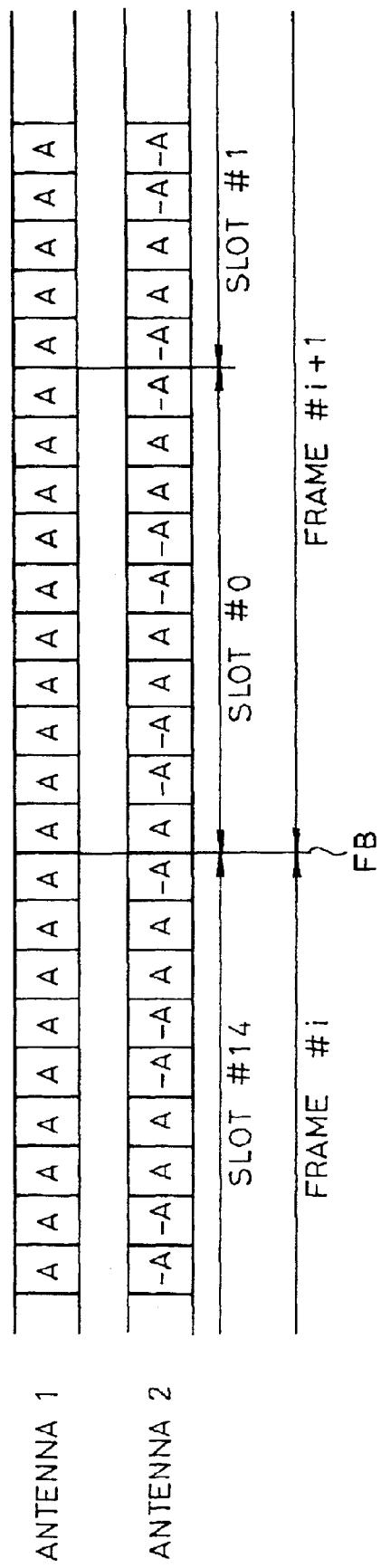
FIG. 7 is an illustration showing a transmission pattern of a primary CPICH symbol upon transmission diversity.
Figure 8:
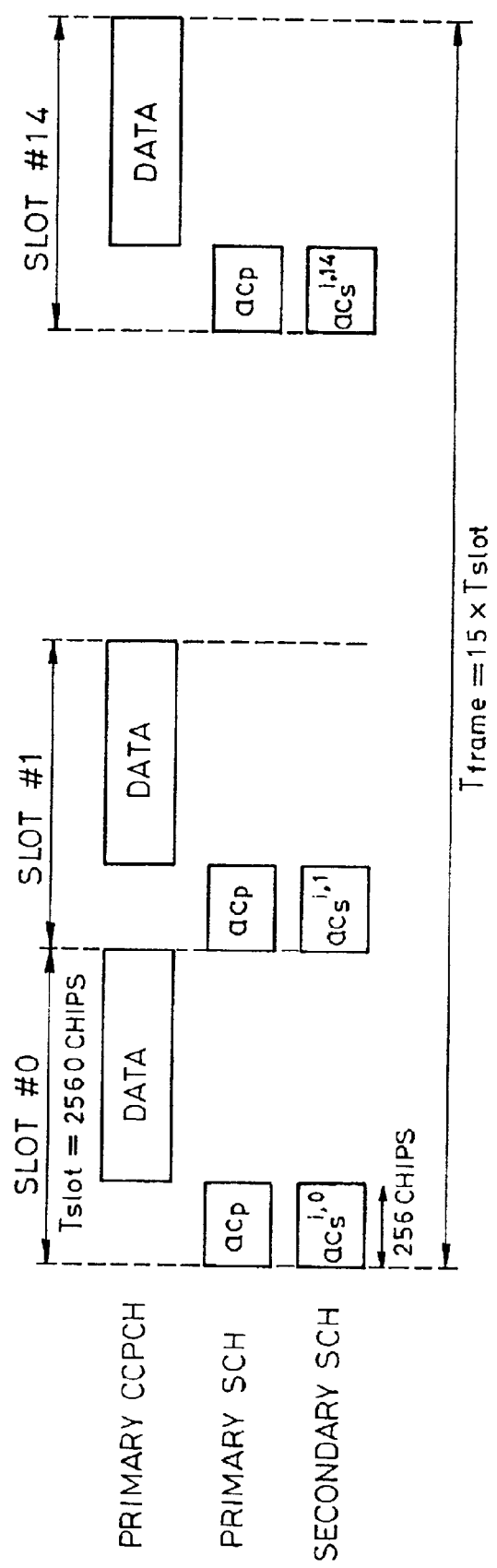
FIG. 8 is an illustration showing a transmission pattern of the SCH.
Figure 9:
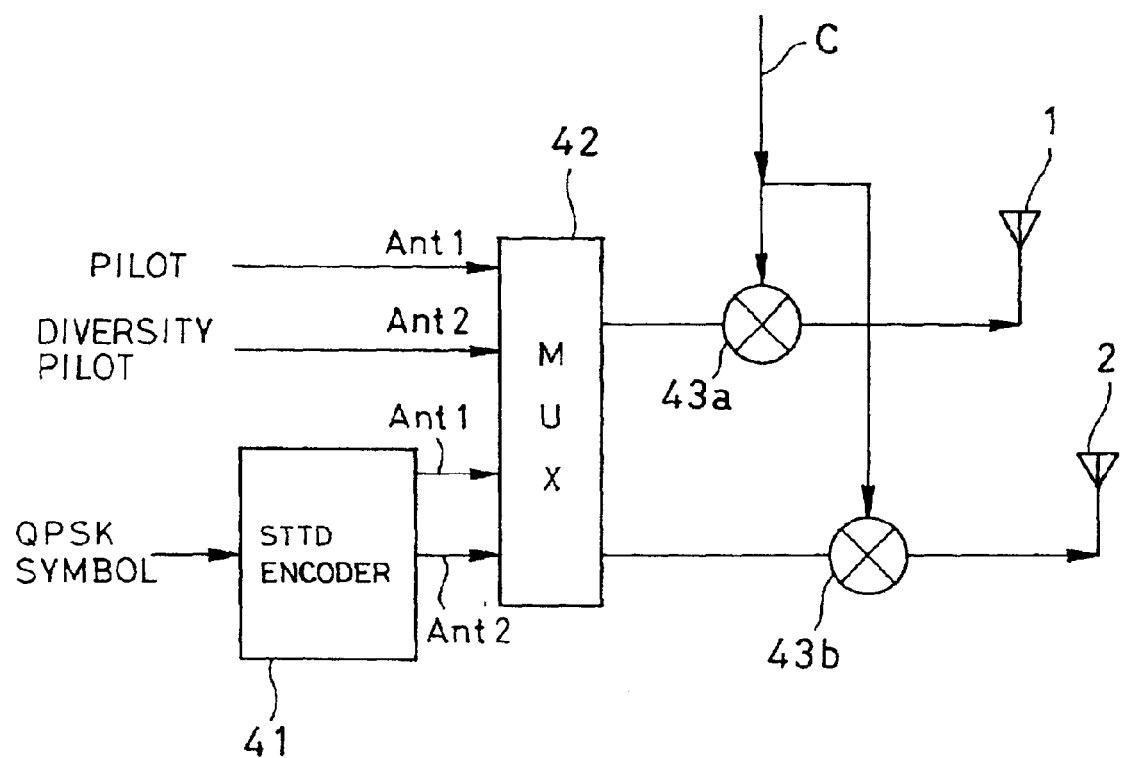
FIG. 9 is an illustration showing a construction for performing STTD transmission diversity.
Figure 10:
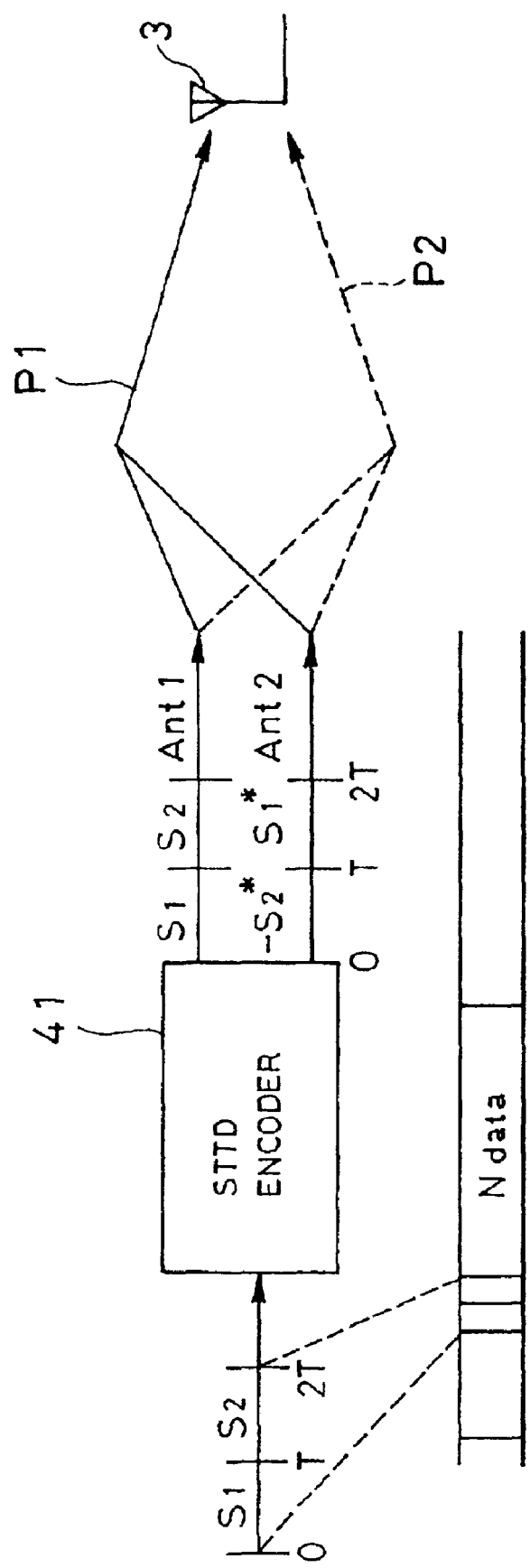
FIG. 10 is an illustration showing an operation for performing STTD transmission diversity.
Figures 11A, 11B:
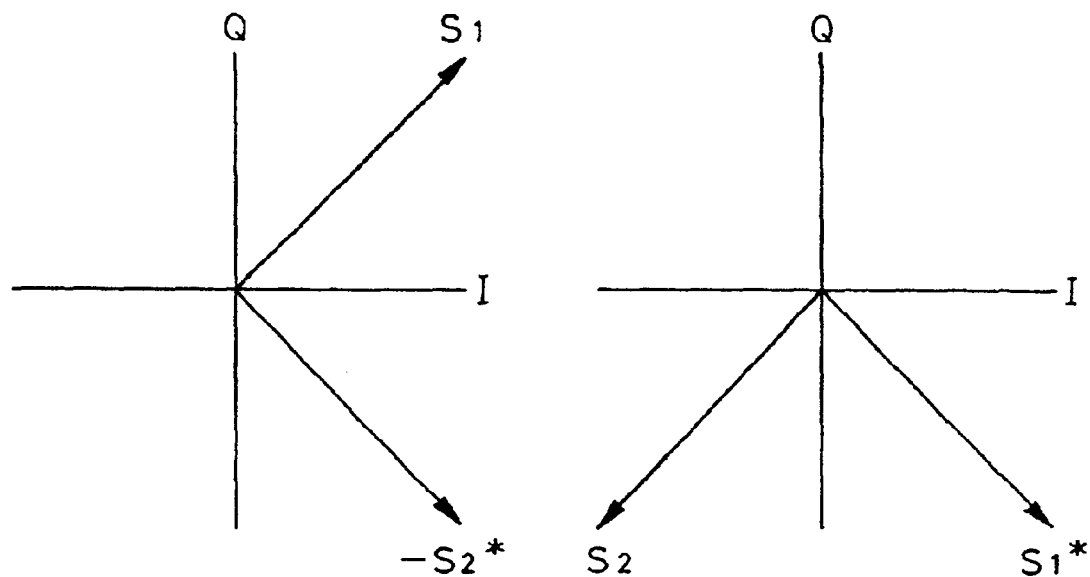
FIGS. 11A and B are vector charts of transmission signals in the transmission diversity.
Figure 12:
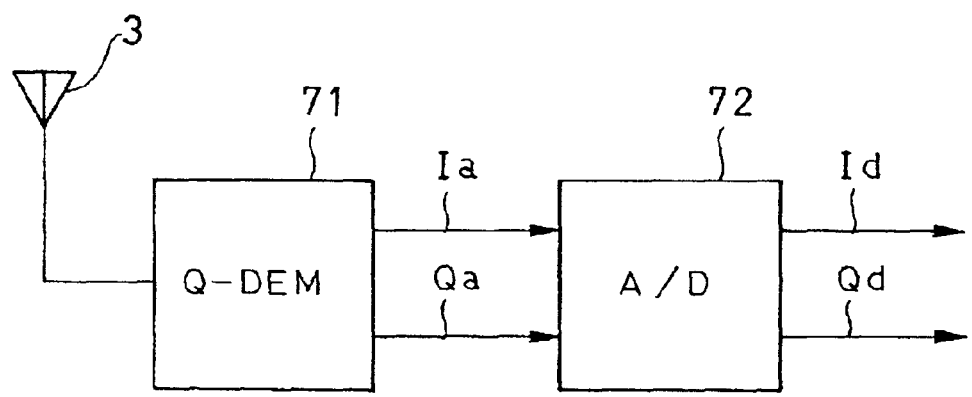
FIG. 12 is a block diagram showing a construction of the major part of a receiver.
Figure 13:
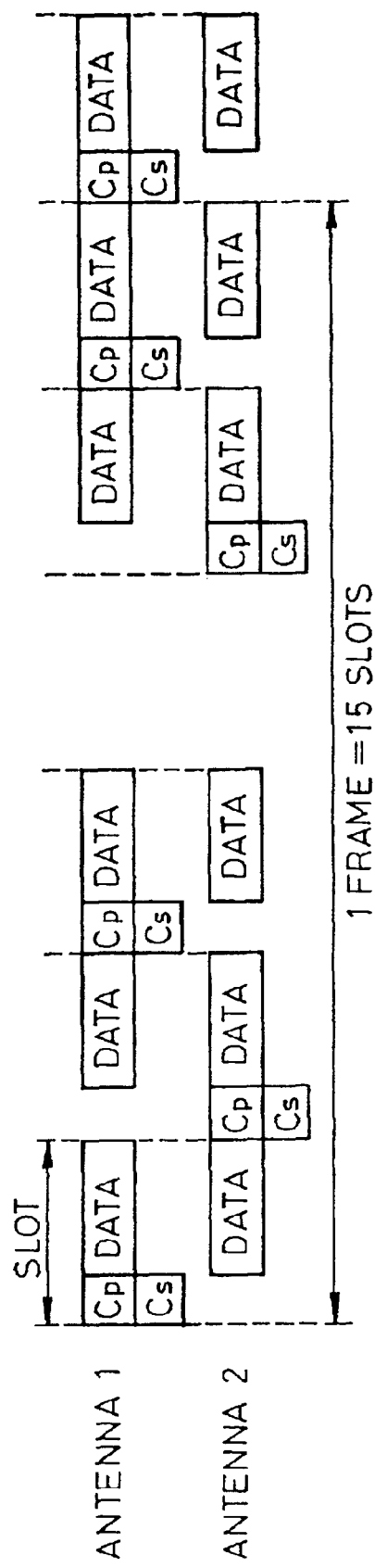
FIG. 13 is an illustration showing a transmission diversity pattern of the SCH.
Figure 14:
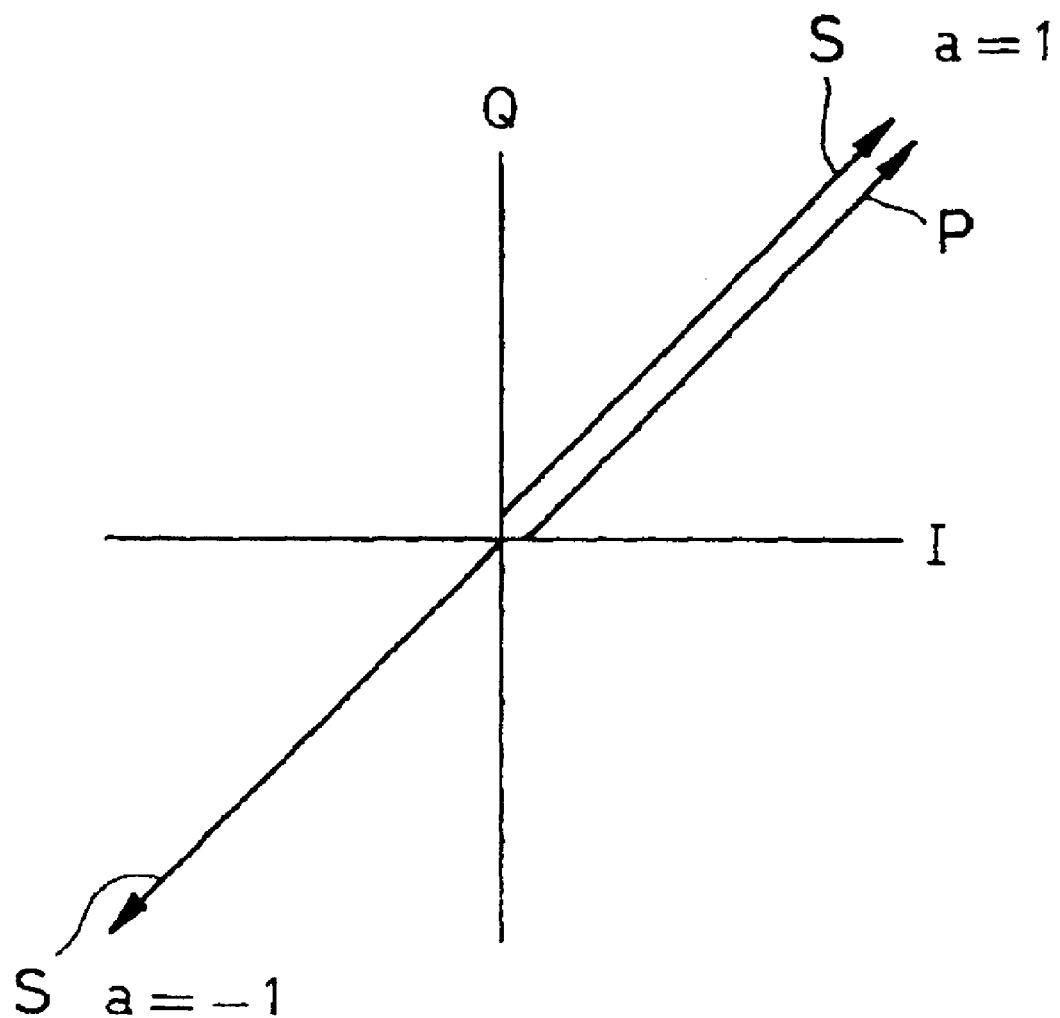
FIG. 14 is an illustration showing a phase relationship between a primary CPICH symbol and a SCH symbol S.

Here, in the structure of the slot and symbol shown in FIGS. 7 and 8, (0)th primary CPICH symbol in (2n)th even number slot is expressed by $C_{2n,0}$, (0)th SCH symbol in (2n)th even number slot at the same position is expressed by $S_{2n,0}$, and the subsequent first primary CPICH symbol at the same slot is expressed as $C_{2n,1}$. Respective symbols are transmitted with spread by a spread code in the base station. Here, it is assumed that despreading with correct spreading code and correct timing is performed for the reception signal, and restoration of the symbol is already completed at the reception side.

It is assumed that the character coefficient of the transmission path from the first antenna 1 of the base station to the antenna on the reception side is $\alpha_1$ and the characteristic coefficient of the transmission path from the second antenna 2 of the base station to the antenna of the terminal on the reception side is $\alpha_2$. Here, when transmission diversity is not performed, only characteristics coefficient $\alpha_1$ is to be considered. These characteristic coefficients $\alpha_1$ and $\alpha_2$ are complex including the phase and amplitude.

Figure 3A:
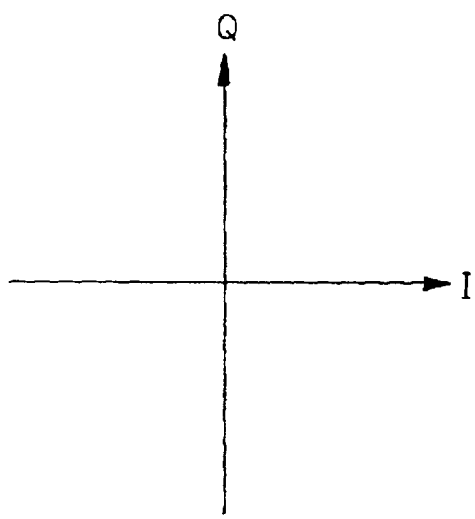
FIG. 3A is an illustration showing meaning of a characteristic coefficient.
Figure 3B:
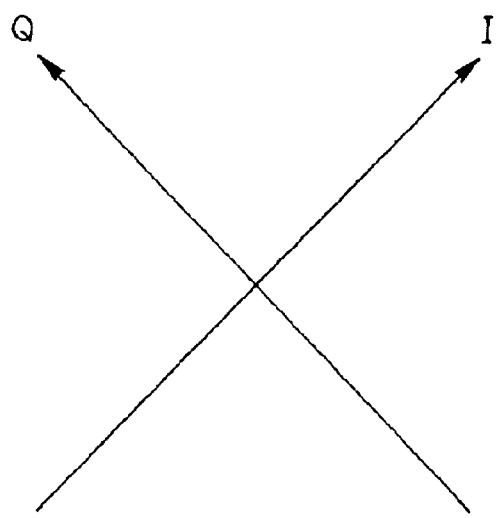
FIG. 3B is an illustration showing meaning of a characteristic coefficient.

Here, meaning of the characteristic chart will be discussed with reference to FIGS. 3A and 3B. In the transmission side, even when transmission is performed in a relationship of the orthogonal coordinate axes as shown in FIG. 3A, it can be received in the relationship of the orthogonal axes as shown in FIG. 3B due to error between reference oscillation frequency between the transmission side and the reception side, or due to rotation of the phase caused by characteristics of the propagation path. One expressing the relationship shown in FIGS. 3A and 3B is the characteristic coefficient.

Figure 4:
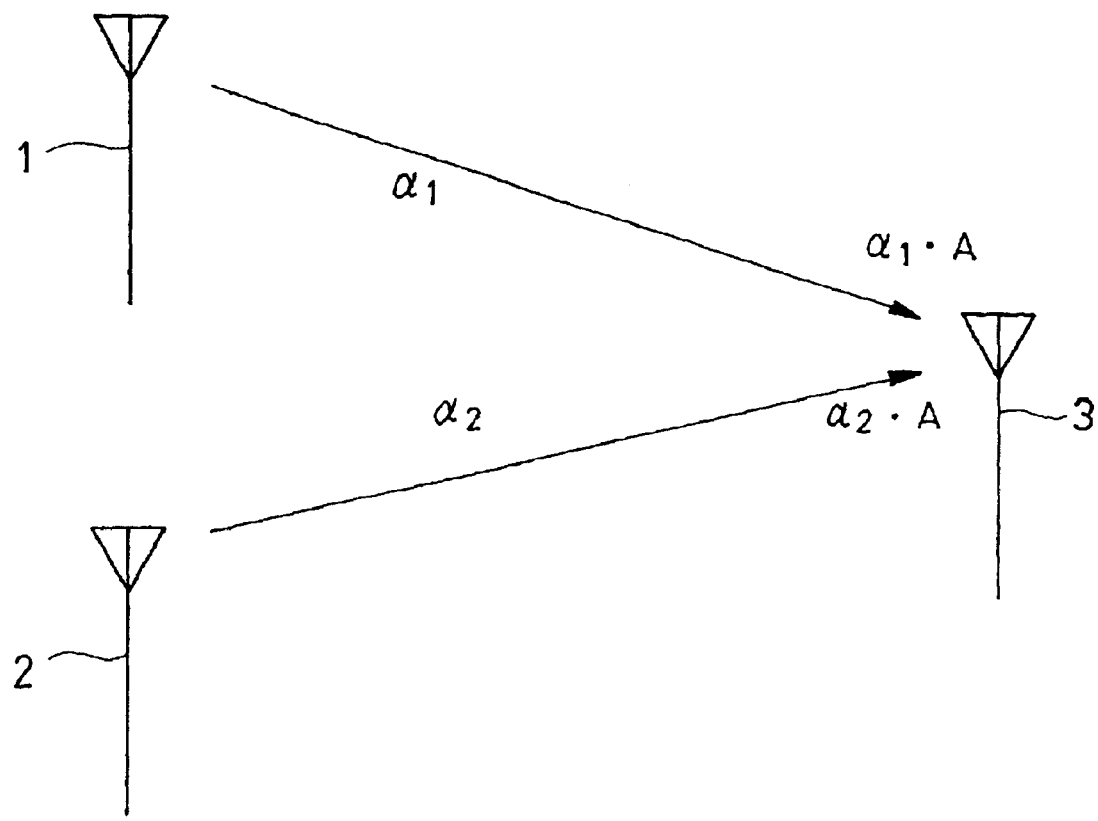
FIG. 4 is an illustration showing a difference of the characteristic coefficient due to difference of transmission antennas.

Namely, as shown in FIG. 4, if the characteristic coefficient from the transmission antenna 1 to the reception antenna 3 is $\alpha_1$, the transmitted symbol A is received as $\alpha_1 \cdot A$. Similarly, assuming that the characteristic coefficient from the transmission antenna 2 to the reception antenna is $\alpha_2$, the transmitted symbol A is received as $\alpha_2 \cdot A$. These characteristic coefficient $\alpha$ can be expressed by the following equation:

$$\alpha = a \cdot e^{j\theta}$$

assuming that variation of amplitude is "a" and variation of the phase is $\theta$.

On the other hand, between the adjacent (0)th symbol and (1)st symbol, variation of the characteristic coefficient is quite small. In consideration that there is an error of the reference oscillation frequency between the base station and the terminal, and there is phase rotation of $e^{j\delta}$ between symbols, (0)th primary CPICH symbol is taken as reference. In the even number slot, irrespective of presence or absence of TSTD, the SCH is modulated by a=1 when the STTD transmission diversity is performed.

Therefore, the foregoing primary CPICH symbol $C_{2n,0}$, the SCH symbol $S_{2n,0}$ and the primary CPICH symbol $C_{2n,1}$ can be expressed by the following equations (1) to (3):

$$C_{2n,0} = \alpha_1 + \alpha_2 \quad (1)$$

$$S_{2n,0} = \alpha_1 \quad (2)$$

$$C_{2n,1} = (\alpha_1 - \alpha_2)e^{j\delta} \quad (3)$$

On the other hand, when STTD transmission diversity is not performed, the SCH is modulated by a=−1. Therefore, the foregoing primary CPICH symbol $C_{2n,0}$, the SCH symbol $S_{2n,0}$ and the primary CPICH symbol $C_{2n,1}$ can be expressed by the following equations (4) to (6):

$$C_{2n,0} = \alpha_1 \quad (4)$$

$$S_{2n,0} = -\alpha_1 \quad (5)$$

$$C_{2n,1} = \alpha_1 e^{j\delta} \quad (6)$$

Next, in order of those discussed in connection with FIG. 1, the arithmetic operations are performed. At first, when STTD transmission diversity is performed, the complex conjugate $C_{2n,0}^*$ of $C_{2n,0}$, the complex conjugate $S_{2n,0}^*$ of $S_{2n,0}$ and the complex conjugate $C_{2n,1}^*$ of $C_{2n,1}$ are calculated by the complex conjugate calculating portions 111, 112 and 113 shown in FIG. 1. Then, calculation by the following equations (7) to (9) are performed by the complex multipliers 121, 122 and 123 to output the result of calculation.

$$C_{2n,0} \times S_{2n,0}^* = |\alpha_1|^2 + \alpha_1^* \alpha_2 \quad (7)$$

$$C_{2n,0}^* \times S_{2n,0} = |\alpha_1|^2 + \alpha_1 \alpha_2^* \quad (8)$$

$$C_{2n,1}^* \times C_{2n,1} = (|\alpha_1|^2 + |\alpha_2|^2 - \alpha_1 \alpha_2^* - \alpha_1^* \alpha_2)|e^{j\delta}|^2 \quad (9)$$

Here, in the foregoing equation (9), $$|e^{j\delta}|^2 = 1$$

Substituting the above equation for the equation (9), the foregoing equation (9) can be modified as following equation (10).

$$C_{2n,1}^* \times C_{2n,1} = |\alpha_1|^2 + |\alpha_2|^2 - \alpha_1\alpha_2^* - \alpha_1^*\alpha_2 \quad (10)$$

Accordingly, the output of the complex adder 130 in FIG. 1 will be expressed as follow:

$$C_{2n,0} \times S_{2n,0}^* + C_{2n,0}^* \times S_{2n,0} + C_{2n,1}^* \times C_{2n,1} = 3|\alpha_1|^2 + |\alpha_2|^2 \quad (11)$$

On the other hand, when STTD transmission diversity is not performed, calculations by the following equations (12) to (14) are performed by the complex multipliers 121, 122 and 123.

$$C_{2n,0} \times S_{2n,0}^* = -|\alpha_1|^2 \quad (12)$$

$$C_{2n,0}^* \times S_{2n,0} = -|\alpha_1|^2 \quad (13)$$

$$C_{2n,1}^* \times C_{2n,1} = |\alpha_1|^2 \quad (14)$$

Accordingly, the output of the complex adder 130 in FIG. 1 is as expressed by the following equation (15).

$$C_{2n,0} \times S_{2n,0}^* + C_{2n,0}^* \times S_{2n,0} + C_{2n,1}^* \times C_{2n,1} = -|\alpha_1|^2 \quad (15)$$

As indicated in the foregoing equations (11) and (15), the result of calculation becomes only scalar amount. The result of calculation becomes positive value (sign is plus) when STTD transmission diversity is performed, and becomes negative value (sign is minus) when STTD transmission diversity is not performed. From the foregoing, with the shown system, by the sign of the result of calculation, it becomes possible to detect whether STTD transmission diversity is performed or not. It should be noted that by performing the detection process for a plurality of even numbered slots and averaging the result of detection, diversity detection with higher certainty can be performed.

Figure 5:
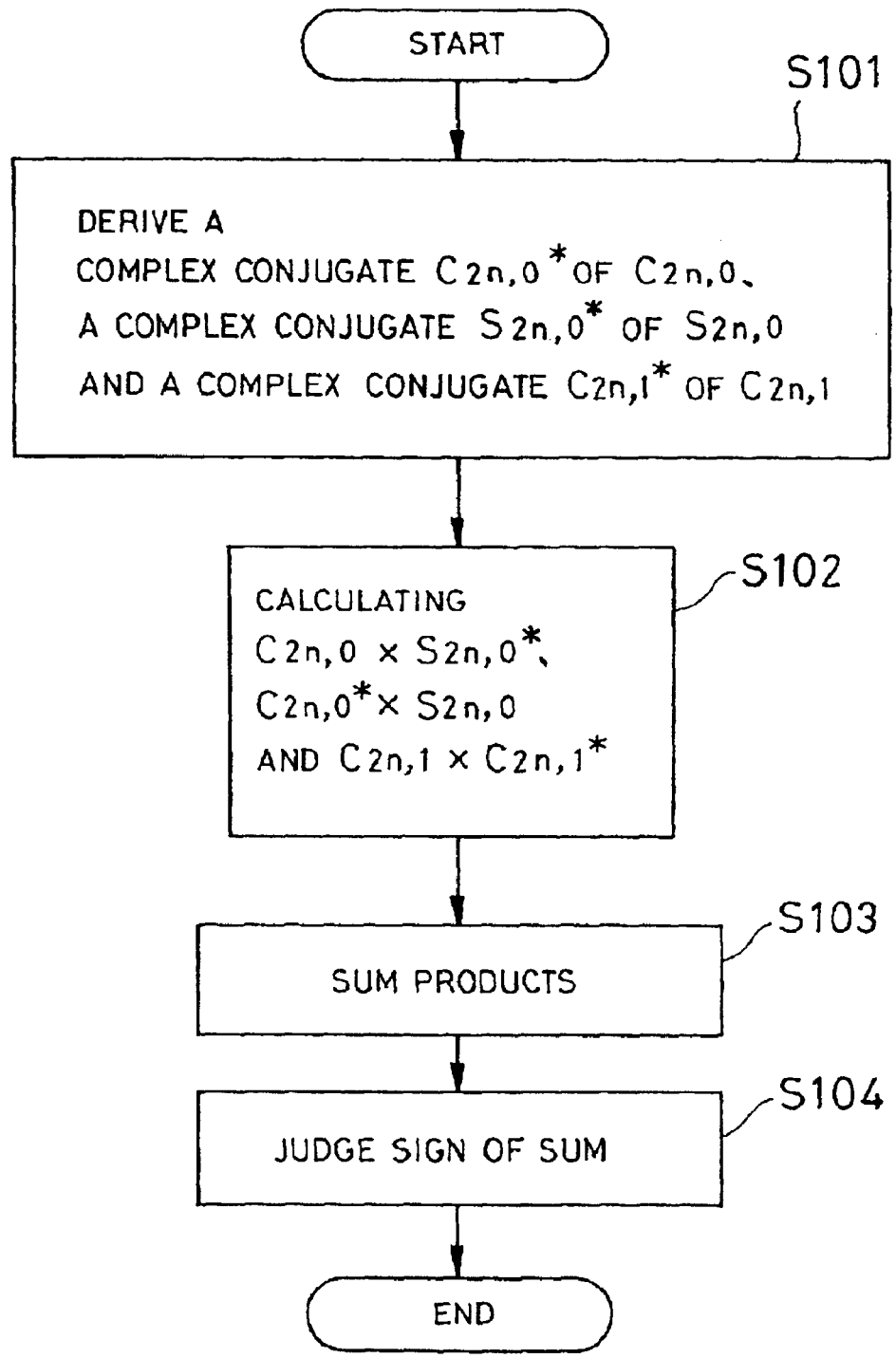
FIG. 5 is a flowchart showing a transmission diversity detection method according to the present invention.

Here, in the circuit construction shown in FIG. 1, the transmission diversity detection method shown in FIG. 5 can be realized. Namely, as shown in FIG. 5, at first, the complex conjugate $C_{2n,0}^*$ of $C_{2n,0}$, the complex conjugate $S_{2n,0}^*$ of $S_{2n,0}$ and the complex conjugate $C_{2n,1}^*$ of $C_{2n,1}$ are derived (step S101). Next, multiplication $C_{2n,0} \cdot S_{2n,0}^*$, multiplication $C_{2n,0}^* \cdot S_{2n,0}$ and multiplication $C_{2n,1} \cdot C_{2n,1}^*$ are performed respectively (step S102). Then, addition of the results of multiplication (products) is performed (step S103). Finally, concerning the result of addition, judgment is made whether the sign of the resultant value is positive or negative (step S104). By performing the foregoing method, it can be detected whether transmission diversity is performed or not.

Figure 6:
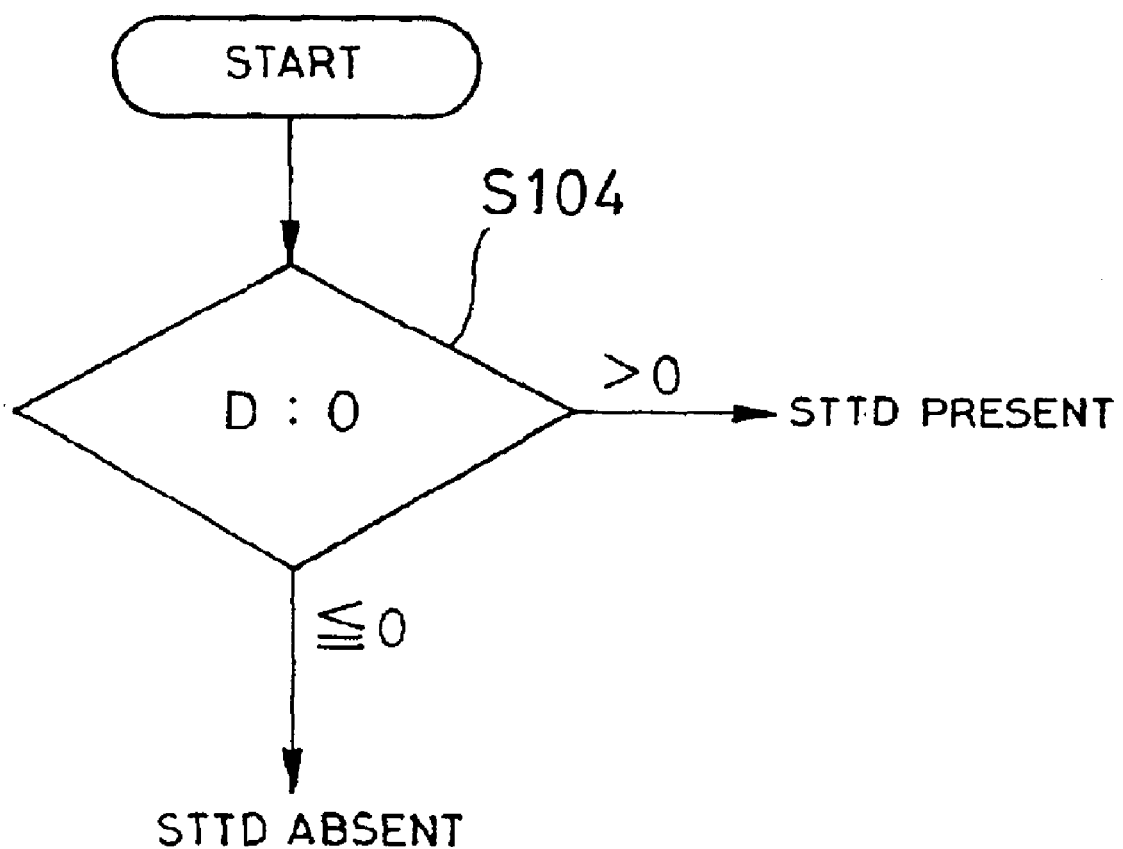
FIG. 6 is a flowchart showing a judgment method of a code resulting from calculation in FIG. 5.

At step S104, a process shown in FIG. 6 is performed. Namely, referring to FIG. 6, comparing the sign D and zero (0), when the sign D is smaller than or equal to zero, judgment can be made that the transmission diversity is not performed to perform normal reception process. On the other hand, when the sign D is greater than zero, judgment can be made that transmission diversity is performed to perform reception process adapting to transmission diversity. As set forth above, reference is made to the result of calculation to check sign of the result of calculation, then whether the transmission diversity is performed or not can be easily detected.

It should be noted that arithmetic operation for the detection process set forth above may be performed upon reception by the receiver, namely upon communication, or upon position registration for communication.

A storage medium storing a program for realizing the process shown in FIGS. 5 and 6 is prepared to control the computer using the stored program to perform transmission diversity detection process. As the storage medium, a semiconductor memory, a magnetic disk drive and other various storage medium may be used.

It should be noted that the foregoing discussion has been given under a premise that the amplitudes of the primary CPICH symbol and the SCH symbol are substantially the same. When amplitudes of the primary CPICH symbol and the SCH symbol are significantly different, the foregoing operation may be performed after adjusting the amplitudes to be consistent with each other.

As set forth above, the present invention can detect presence or absence of STTD transmission diversity by simple arithmetic operation. On the other hand, presence or absence of STTD transmission diversity can be detected within a short period, namely within a period of two symbols at the shortest. Furthermore, even when there is an error in reference frequencies between the base station and the terminal, presence or absence of STTD transmission diversity can be detected without requiring particular prediction and correction process.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A transmission diversity detection circuit for notifying presence or absence of a transmission diversity of spread spectrum communication by modulation of SCH (Synchronization channel), comprising:
    arithmetic means for calculating a calculated value of $C_{2n,0} \times S_{2n,0}^* + C_{2n,0}^* \times S_{2n,0} + C_{2n,1}^* \times C_{2n,1}$,
    in first and second symbols in a predetermined number of series of slots with respect to a reception signal, taking a primary CPICH (common pilot channel) symbol with respect to said first symbol as $C_{2n,0}$, a SCH symbol with respect to said first symbol as $S_{2n,0}$, a primary CPICH symbol with respect to said second symbol as $C_{2n,1}$;
    taking a complex conjugate of said primary CPICH symbol $C_{2n,0}$ as $C_{2n,0}^*$, a complex conjugate of SCH symbol $S_{2n,0}$ as $S_{2n,0}^*$, a complex conjugate of said primary CPICH symbol $C_{2n,1}$ as $C_{2n,1}^*$; and
    judgment means for making judgment whether transmission diversity is present or not depending upon positive or negative of said calculated value.

2. A transmission diversity detection circuit as set forth in claim 1, wherein said arithmetic means comprises:
    circuits for deriving said complex conjugate $C_{2n,0}^*$ of said primary CPICH symbol $C_{2n,0}$, a complex conjugate $S_{2n,0}^*$ of SCH symbol $S_{2n,0}$, and a complex conjugate $C_{2n,1}^*$ of said primary CPICH symbol $C_{2n,1}$;
    multipliers calculating $C_{2n,0} \times S_{2n,0}^*$, $C_{2n,0}^* \times S_{2n,0}$ and $C_{2n,1}^* \times C_{2n,1}$; and
    an adder calculating a sum of $C_{2n,0} \times S_{2n,0}^* + C_{2n,0}^* \times S_{2n,0} + C_{2n,1}^* \times C_{2n,1}$,
    said judgment means makes judgment whether transmission diversity is performed or not depending upon positive or negative of sign of said sum.

3. A transmission diversity detection circuit as set forth in claim 1, wherein said predetermined slot is even numbered slots in one frame, said first and second symbols are (0)th and first symbols of said slot.

4. A transmission diversity detection circuit as set forth in claim 1, wherein said arithmetic means performs arithmetic operation upon performing communication.

5. A transmission diversity detection circuit as set forth in claim 1, wherein said arithmetic means performs arithmetic operation upon registration of position for communication.

6. A transmission diversity detection method for notifying presence or absence of a transmission diversity of spread spectrum communication by modulation of SCH (Synchronization channel), comprising:

calculating a calculated value of $C_{2n,0} \times S_{2n,0}^* + C_{2n,0}^* \times S_{2n,0} + C_{2n,1}^* \times C_{2n,1}$, in first and second symbols in a predetermined number of series of slots with respect to a reception signal, taking a primary CPICH (Common pilot channel) symbol with respect to said first symbol as $C_{2n,0}$, a SCH symbol with respect to said first symbol as $S_{2n,0}$, and a primary CPICH symbol with respect to said second symbol as $C_{2n,1}$, and taking a complex conjugate of said primary CPICH symbol $C_{2n,0}$ as $C_{2n,0}^*$, a complex conjugate of SCH symbol $S_{2n,0}$ as $S_{2n,0}^*$, and a complex conjugate of said primary CPICH symbol $C_{2n,1}$ as $C_{2n,1}^*$; and judging whether transmission diversity is present or not depending upon positive or negative of said calculated value.

7. A transmission diversity detection method as set forth in claim 6, wherein said calculating step comprises:

deriving said complex conjugate $C_{2n,0}^*$ of said primary CPICH symbol $C_{2n,0}$, a complex conjugate $S_{2n,0}^*$ of SCH symbol $S_{2n,0}$, and a complex conjugate $C_{2n,1}^*$ of said primary CPICH symbol $C_{2n,1}$;

calculating $C_{2n,0} \times S_{2n,0}^*$, $C_{2n,0}^* \times S_{2n,0}$ and $C_{2n,1}^* \times C_{2n,1}$; and calculating a sum of $C_{2n,0} \times S_{2n,0}^* + C_{2n,0}^* \times S_{2n,0} + C_{2n,1}^* \times C_{2n,1}$, said judging step judges whether transmission diversity is performed or not depending upon positive or negative of sign of said sum.

8. A transmission diversity detection method as set forth in claim 6, wherein said predetermined slot is even numbered slots in one frame, said first and second symbols are (0)th and first symbols of said slot.

9. A storage medium storing a program implementing a transmission diversity detection method for notifying presence or absence of a transmission diversity of spread spectrum communication by modulation of SCH (Synchronization channel), said program comprising:

calculating a calculated value of $C_{2n,0} \times S_{2n,0}^* + C_{2n,0}^* \times S_{2n,0} + C_{2n,1}^* \times C_{2n,1}$, in first and second symbols in a predetermined number of series of slots with respect to a reception signal, taking a primary CPICH (Common pilot channel) symbol with respect to said first symbol as $C_{2n,0}$, a SCH symbol with respect to said first symbol as $S_{2n,0}$, and a primary CPICH symbol with respect to said second symbol as $C_{2n,1}$, and taking a complex conjugate of said primary CPICH symbol $C_{2n,0}$ as $C_{2n,0}^*$, a complex conjugate of SCH symbol $S_{2n,0}$ as $S_{2n,0}^*$, and a complex conjugate of said primary CPICH symbol $C_{2n,1}$ as $C_{2n,1}^*$; and judging whether transmission diversity is present or not depending upon positive or negative of said calculated value.

10. A storage medium as set forth in claim 9, wherein said calculating step comprises:

deriving said complex conjugate $C_{2n,0}^*$ of said primary CPICH symbol $C_{2n,0}$, a complex conjugate $S_{2n,0}^*$ of SCH symbol $S_{2n,0}$, a complex conjugate $C_{2n,1}^*$ of said primary CPICH symbol $C_{2n,1}$ and a complex conjugate $S_{2n,1}^*$ of said SCH symbol $S_{2n,1}$;

calculating $C_{2n,0} \times S_{2n,0}^*$, $C_{2n,0}^* \times S_{2n,0}$ and $C_{2n,1}^* \times C_{2n,1}$; and calculating a sum of $C_{2n,0} \times S_{2n,0}^* + C_{2n,0}^* \times S_{2n,0} + C_{2n,1}^* \times C_{2n,1}$, said judging step judges whether transmission diversity is performed or not depending upon positive or negative of sign of said sum.

11. A storage medium as set forth in claim 9, wherein said predetermined slot is even numbered slots in one frame, said first and second symbols are (0)th and first symbols of said slot.

* * * * *